Patented Feb. 23, 1943

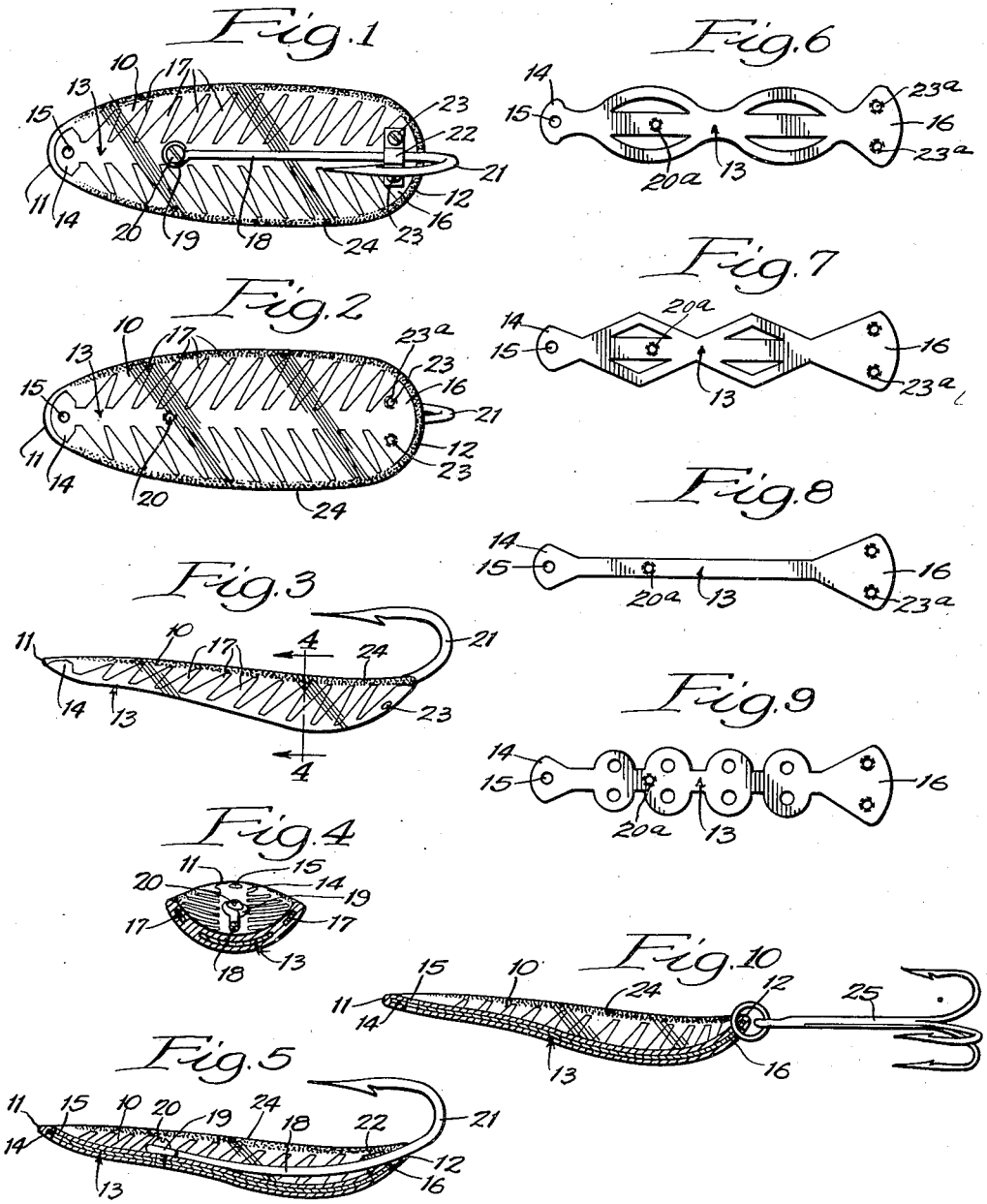

2,311,985

UNITED STATES PATENT OFFICE 2,311,985

SPOON BAIT

John Heddon, Dowagiac, Mich., assignor to James Heddon's Sons, Dowagiac, Mich., a corporation of Michigan Application January 29, 1941, Serial No. 376,417

5 Claims. (Cl. 43—45)

The present invention is directed to a fish bait of spoon formation, and composed of a suitable transparent or semi-transparent composition such as tenite or the like; and the object of the present invention is to provide a suitable interior metallic reinforcement which will not only give added strength and rigidity to the composition body but will also serve to resist the draft strains incidental to the landing of game fish, and which will at the same time afford an opaque obstruction to the passage of light through the body of the bait, so that by suitably configuring the interior metallic reinforcement any desired pattern effect can be secured, which will display itself in the form of a silhouette against the relatively luminous background afforded by the transparent bait body.

Further objects and details will appear from the description of the invention in conjunction with the accompanying drawing, wherein the principles of the present invention are exemplified in connection with a spoon bait, in which—

Figure 1 illustrates the upper or concave surface of the bait;

Fig. 2 is a bottom view of the bait;

Fig. 3 is a side elevation thereof;

Fig. 4 is a cross sectional view taken on line 4—4 of Fig. 3;

Fig. 5 is a longitudinal sectional view thereof;

Figs. 6, 7, 8, and 9 are modified forms of metallic reinforcement illustrating the method of imparting any desired pattern effect to the bait body; and Fig. 10 is a modification illustrating the use of a trailing hook member with any of the forms of body reinforcement.

The body 10 is of concavo-convex formation, and as shown is in the form of an elongated spoon converging at its forward end to a relatively narrow tip 11 and rounded at its rear end 12. The bait body is formed of suitable composition which is relatively transparent, and by the term "transparent" I intend to include varying degrees of transparency commonly referred to under the term translucent.

The thickness of the spoon body is relatively greater than that of metallic spoons of similar formation, and embedded within the wall of the body and extending centrally therethrough is a reinforcing plate 13 of metal which terminates at its forward end in an enlarged head 14 provided with an aperture 15 which registers with apertures in the surrounding composition to afford a line tie for the bait. The reinforcing plate at its rear end terminates in an enlarged rear head 16, and as shown particularly in Figs. 1, 2 and 3, the intermediate portion of the reinforcing plate is provided with lateral projecting prongs 17 which curve upwardly to conform to the general transverse curvature of the spoon itself and which serve to afford lateral reinforcement for the walls of the spoon.

The reinforcing plate also serves to afford attachment for a hook 18 which at its forward end terminates in an eye 19 through which is entered a screw connection 20 threaded into a hole 20a in the reinforcing plate. The rear end of the hook terminates in the usual upstanding barbed portion 21, and the shank of the hook near its rear end is secured by a clip 22 through which are entered screws 23 which extend into threaded holes 23a in the enlarged rear head 16 of the reinforcing plate.

By securing the hook in the manner stated, and providing the line tie at the forward end of the metallic reinforcing plate, the composition body will be relieved from draft strains and adequate provision will be made for the reception of the screws 20 and 23 which serve to firmly secure the hook in position.

By reason of the transparency of the composition body, the metal reinforcement will be clearly visible from either side of the body, so that when viewed against the natural light afforded within the water during daylight fishing conditions, the reinforcement will be silhouetted against a relatively luminous background, and will thus afford the desired pattern or design in lieu of any extensive decoration upon the surface of the bait, although, as shown, the margins of the bait body are provided with a surface striping 24, which renders this portion of the bait practically opaque; and it will be understood that the employment of a reinforcing plate embedded within the interior of the bait body does not preclude the use of more or less transparent surface markings, which, however, merely supplement the silhouette effect occasioned by the opacity of the embedded reinforcement.

As further exemplifications of the manner in which the interior reinforcing plate may be employed to afford any pattern effect which may be desired, I have shown various forms of reinforcing plates in Figs. 6, 7, 8 and 9, it being understood, however, that these are merely intended to illustrate the principles involved, and that other patterns having details too numerous to mention may be employed for a like purpose. In fact, the employment of an embedded interior plate of the character described enables innumerable variations in pattern to be obtained by embedding an opaque reinforcing plate within the interior of a transparent bait body, and all of these pattern effects may be obtained without sacrifice of the reinforcing and draft sustaining functions referred to.

Although the invention has been designed primarily as a reinforcement for a composition spoon bait, it is not the intention, unless otherwise indicated in the claims, to necessarily limit the use of a patterned reinforcing plate to a bait body of spoon formation, since similar effects would be realized from its use within bait bodies of transparent or semi-transparent character in which the silhouette pattern effect might be obtained.

Furthermore, the invention is not limited to the use of a rigidly attached single hook, since the body may afford attachment for a trailing hook member such for instance as the gang 25 shown in Fig. 10 or a single or double hook similarly secured.

I claim:

1. A fish lure in the form of a dished spoon shaped bait body relatively thin in section and composed of relatively transparent composition, having embedded through the interior thereof a longitudinally extending metal reinforcing draft plate surrounded on each side and along its edges by the body composition and having an irregular edge contour to display a pattern in silhouette against the relatively luminous background and having a line tie aperture at its forward end, and a hook secured to the bait body by attaching means engaged with the reinforcing plate.

2. A fish lure in the form of a spoon shaped bait body of relatively transparent composition, having embedded through the interior thereof a longitudinally extending metal reinforcing draft plate and having a line tie aperture at its forward end, a hook having its shank lying against the spoon shaped body and with its barbed end upwardly extending above the body, and attaching means engaging the hook shank and entered through the body and into the reinforcing plate.

3. A fish lure in the form of a spoon shaped bait body of relatively transparent composition, having embedded through the interior thereof a longitudinally extending metal reinforcing draft plate having an irregular edge contour to display a pattern and having a line tie aperture at its forward end, a hook having its shank lying against the spoon shaped body and with its barbed end upwardly extending above the body, and attaching means engaging the hook shank and entered through the body and into the reinforcing plate.

4. A fish lure in the form of a spoon shaped bait body of relatively transparent composition, having embedded through the interior thereof a longitudinally extending reinforcing metallic draft plate provided along its edges with laterally extending projections adapted to afford lateral reinforcement for the bait body and configured to display a pattern in silhouette against the luminous background afforded by the relatively transparent bait body, the reinforcing plate being provided at its forward end with means for attaching a line, and being provided rearwardly of the forward end with means for the attachment of a hook to relieve the bait body from draft strains, and a hook secured to said attaching means.

5. A fish lure in the form of a spoon-shaped bait body of relatively transparent composition having embedded through the interior thereof a longitudinally-extending reinforcing metallic draft plate provided along its edges with laterally extending projections adapted to afford lateral reinforcement for the bait body and configured to display a pattern in silhouette against the luminous background afforded by the relatively transparent-bait body, a hook having its shank lying against the spoon-shaped body and having its barbed end upwardly extending above the body, and attaching means engaging the hook shank and entered through the composition of the body and into the reinforcing plate.

JOHN HEDDON.